United States Patent [19]

Wittmann

[11] Patent Number: 4,715,565
[45] Date of Patent: Dec. 29, 1987

[54] CLAMPING CONNECTION ASSEMBLY FOR SPACECRAFT

[75] Inventor: Alois Wittmann, Palos Verdes, Calif.

[73] Assignee: Hughes Aircraft Company, Los Angeles, Calif.

[21] Appl. No.: 866,812

[22] Filed: May 27, 1986

[51] Int. Cl.⁴ .............................................. B64G 1/64
[52] U.S. Cl. ................................ 244/158 R; 102/377; 285/407; 220/321; 244/120; 244/131
[58] Field of Search ................... 244/131, 158 R, 120, 244/161; 102/377, 378; 285/407, 408–413; 220/320, 321

[56] References Cited

U.S. PATENT DOCUMENTS

| | | | |
|---|---|---|---|
| 1,080,825 | 12/1913 | Fryer | 285/407 |
| 3,098,581 | 7/1963 | Marsilio | 220/320 |
| 3,286,630 | 11/1966 | Salmirs et al. | 102/377 |
| 3,458,217 | 7/1969 | Pride, Jr. et al. | 102/378 |
| 3,636,877 | 1/1972 | Eaton, Jr. | 102/378 |

Primary Examiner—Galen Barefoot
Attorney, Agent, or Firm—S. M. Mitchell; M. J. Meltzer; A. W. Karambelas

[57] ABSTRACT

An improved clamping connection assembly for separable parts of spacecraft is provided and includes a tension belt for securing a plurality of retainers against camming surfaces on flange members on separable spacecraft component parts. The other peripheral edges of the flange members have detents to respectively receive a single shear pin mounted on each of the retainers. The shear pins receive any shear and torsional forces and transmits them between the structural parts of the spacecraft components without creating additional forces on the tension belt.

10 Claims, 7 Drawing Figures

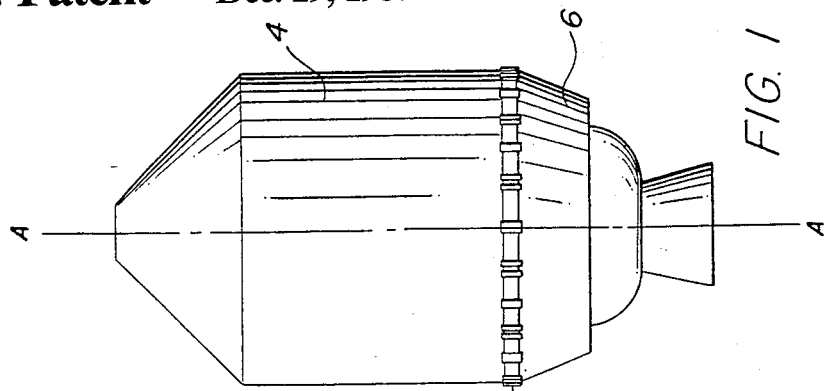
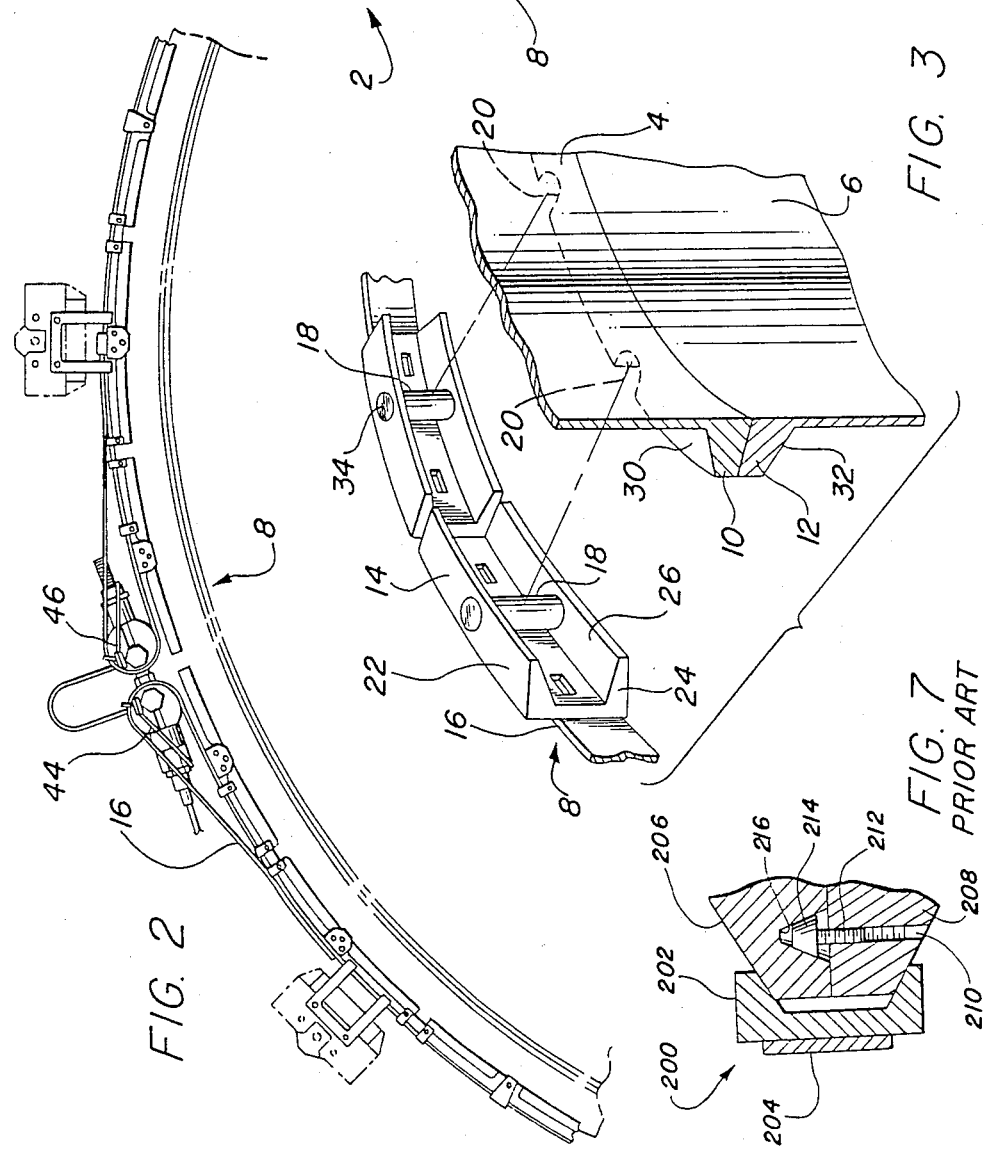
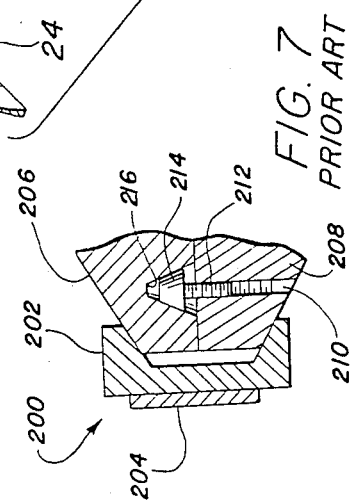
FIG. 1
FIG. 2
FIG. 3
FIG. 7 PRIOR ART

CLAMPING CONNECTION ASSEMBLY FOR SPACECRAFT

BACKGROUND OF THE INVENTION

1. Field of the Invention

The present invention is directed to a clamping connection assembly for retaining separable component parts of a spacecraft and more particularly, to a V-clamp connection assembly capable of preventing relative rotational movement and transmitting shear and torsional forces without changing the axial load created by a tension strap used to retain the separable components of a spacecraft.

2. Description of the Prior Art

Connection assemblies, for example, those that retain separable parts of a spacecraft, provide important structural links in the primary load path of a spacecraft during both boost and ascent flight and also, if necessary, during re-entry. For example, satellites frequently jettison a portion of their structure, such as a propulsion motor, as it is lifted into a permanent orbit. As can be readily appreciated, spacecraft connection assemblies must be designed not only for low weight, but also for extremely high reliability due to the high cost of the spacecraft launch and the general inaccessibility to rectify any errors.

As this particular field of art has advanced from the 1950s to the present day, there has been a recognition of the design requirement of minimizing the component parts that can fail. Even today with the realization of the launching of satellites and spacecraft from the Space Shuttle, the high cost involved in employing a human being in space still requires a connection assembly design that will be automatic, without human intervention and with an extremely high reliability. Likewise the design criteria of minimizing weight remains as important as ever giving the high cost of transmitting the payload of a spacecraft into outer space. Designers in this field have recognized the desirability of using tension band clamping assemblies, instead of exploding connecting assemblies, to hold together separable components of a spacecraft and thereby minimizing any pyro-shock that could adversely vibrate the payload of the spacecraft, such as electronic components.

In the 1960s, a connection assembly design referred to as the Marman Band was proposed which included a plurality of V-retainers or wedged shaped shoe members that provided a V-clamping to flanges positioned on the exterior surfaces of separable component parts of the spacecraft. A pair of separable tension bands were joined together by a pair of spaced pyrotechnic tension bolts that could adjustable vary the tension in the straps that held the V-band coupling members. The tension straps were utilized to create inwardly radial forces on the V-shaped retainers which would in turn, wedge the flanges of cylindrical housing structures of separable component parts of the spacecraft in an axial direction. This V-band coupling was basically configured to transfer axial loads and bending moments across the resulting structural joint of the connection assembly. Small shear torque loads were transferred across the joint by relying on friction that would exist between the flange surfaces and the retainer wedges. If the spacecraft was to be subject to considerable forces that would produce large shear torque loads, either keys were inserted between the flanges or the friction load that was applied during the loading of the tension straps, had to be carefully controlled to take into consideration the magnitude of the shear torque forces that were to be expected.

Thus prior to the advent of the Space Shuttle, the primary connection assembly relied upon for separable spacecraft component parts were V-band couplings that were encircled with tension straps to maintain an axial loading between the spaceship component parts. Usually the friction of the band and the axial loading friction on the flanges or cylindrical structures of the spacecraft component parts were relied upon to handle any shear and torque forces.

The cause of the shear and torque forces resulted from many separate sources such as transitory forces due to the cyclic nature of a rocket burn particularly in solid fuel rockets, variances in the center of gravity of the fuel container during the burn-off, changes in nozzle direction to control the rocket, changes in trajectory of the rocket to achieve the desired orbit path, flexing of the rocket itself during flight, vibrations, etc. Usually however, the ratio of the longitudinal forces generated during flight to any transverse loading was about 10:1.

However, a significant increase in shear and torque forces occurred when spacecraft were to be launched from the bay of the Space Shuttle. As can be seen in FIG. 4, the spacecraft payload was positioned offset from the principle rocket thrust from the rockets 102 and this position can produce force ratios that approached a 1:1 ratio between the axial force loading and the transverse loading. Additionally, the spacecraft was usually mounted to be cantilevered from releasable restrains that permitted additional transverse vibration to be created, since the minimum number of restraining points provided the least number of possible failure points. Additionally, the Space Shuttle 100 also required designing any clamp connection assembly to take into consideration the possibility of re-entry landing if necessary and its associated high transverse loading.

When the magnitude of the transverse loading was appreciated, attempts were made to add a spline between the flanges of the separable component parts of the spacecraft to resolve the problem. It was recognized that in increasing the capacity of transmitting the shear and torsional forces that an increase in the possibility of seizing between the separable components parts would occur. It was also recognized that metallic parts that rub together had a higher probability of seizing or even welding together in outerspace than doing so on earth.

Additionally, the use of the Space Shuttle further provided an ability to increase the diameter of spacecraft as compared to rocket launched spacecraft and with the larger diameters, there was a greater need to transmit the shear and torsional forces and thereby prevent any relative rotational movement between the separable spacecraft component parts.

The increased shear carrying requirement for shuttle launched spacecraft is derived as follows:

Transverse force balance $$S = f\left(P_{ax} + \frac{4SH}{D}\right) \tag{1}$$

where
$S = mg_T$ Transverse force
$P_{ax} = mg_A$ Axial force
m = Spacecraft means D=clamp diameter
H=spacecraft center of weight above connection clamp
$g_T$=transverse acceleration
$g_A$=axial acceleration
f=coefficient of friction at clamp (shear carrying requirement)
Substitution yields $$f = \frac{1}{g_A/g_T + \frac{4H}{D}} \qquad (2)$$

This equation (2) is best evaluated by inserting typical values for a shuttle and expendable rocket launched spacecraft as listed in Table 1.

TABLE 1

| | Load factors | | Configuration parameters | | Shear factor |
|---|---|---|---|---|---|
| | $g_A$ | $g_T$ | H | D | f |
| Shuttle | 4 | 6 | 40 | 90 | .41 |
| Expendable Rocket | 16 | 1.5 | 30 | 36 | .07 |

The shear factor for a shuttle launched spacecraft far exceeds that of an expendable rocket and a factor of 0.4 can not reliably be provided by friction. Thus, a mechanical shear bearing member is needed.

An additional limitation in the design of connection assemblies was the clear recognition that the tension band design had reached a fairly developed and reliable state of art and it was necessary in resolving the problems presented by this increase in shear and torsional forces that no additional load would be asserted on the tension band that would require further redesign.

One of the proposed prior art solutions to this problem is illustrated in FIG. 7, wherein a connector assembly 200 utilizes a series of aluminum wedge blocks 202 that are forced against the joint flange members 206 and 208 by a clamp tension band 204. The internal surface of the flange member 206 has a series of conical detents of approximately 60 in number, that are spaced about the diameter of the flange, for receiving shear cones 214 that are adjustably mounted on threaded shafts 212 journalled within threaded ports 210 in the lower flange member 208. Thus, the individual shear cones could be adjusted to eliminate any possible gap in the detent on the flange member 206. It is necessary, however, to ensure that no seizing or binding occurs and therefore testing on appropriate and expensive test jigs is required to determine if the shear cones are not binding on the separable spacecraft component parts, for example, by physically separating the component parts during spacecraft testing. As can be readily appreciated, the slanting surfaces of the cones which were positioned at conical surfaces that subscribed at an acute angle of 15° to 20°, provided in effect, camming surfaces and any shear load application as well as misalignment would produce corresponding counter axial forces that would increase the radial force load on the tension band.

Thus there is still a need in this aerospace field to improve the clamping connection assembly that is used to hold two separable component parts of a spacecraft together.

SUMMARY OF THE INVENTION

The present invention provides a clamping connection assembly for a spacecraft having first and second separable spacecraft components that are held together by a releasable tension strap. Each of the spacecraft components have flange members with exterior camming surfaces and contact surfaces. The respective contact surfaces can be planar and smooth, which is consistent with successful prior art designs that have been proven through repetitive experiences in outerspace. A plurality of retainer members or free floating wedges of a clamping connection assembly are used for transmitting the radial forces of the tension strap to the respective flange members of the first and second spacecraft component parts.

In the preferred embodiment, a single shear pin can be mounted to extend between the retainer member camming surfaces to entirely restrain the shear and torsional forces with out increasing the axial load in the tension strap and further, without locking the connection assembly and thereby prohibit a predetermined release from the smooth contact surfaces. Detents on the outer peripheral edges of each of the flange members of the spacecraft component parts are complimentarily designed to receive the shear pins. Finally, leaf springs can bias the shear pins into the detents.

BRIEF DESCRIPTION OF THE DRAWINGS

The objects and features of the present invention will become readily apparent from the following detailed description taken in conjunction with a preferred embodiment thereof, with reference to the accompanying drawings, in which like parts are designated by like reference numerals and in which:

FIG. 1 is a schematic side elevational view of a spacecraft embodying the present invention;

FIG. 2 is a partial plan view of a clamping connection assembly;

FIG. 3 is a schematic exploded view of the connection assembly of the present invention;

FIG. 7 is a side cross-sectional view of an example of prior art.

DETAILED DESCRIPTION OF THE PREFERRED EMBODIMENT

Figure 4:
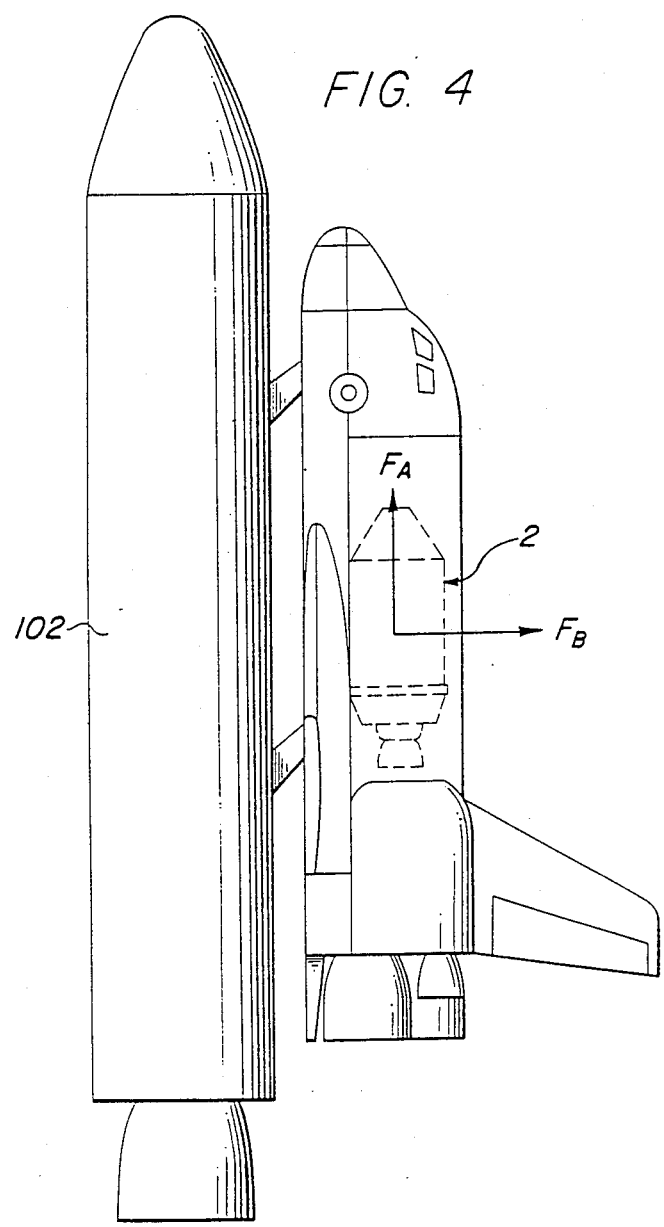
FIG. 4 is a schematic side elevational view of a Space Shuttle and rocket.

The following description is provided to enable any person skilled in the aerospace industry to make and use the invention, and it sets forth the best mode contemplated by the inventor of carrying out the invention. Various modifications, however, will remain readily apparent to those skilled in the above art, since the generic principles of the present invention are applied herein specifically to provide a relatively economical and easily manufactured clamping connector assembly for spacecraft.

In accomplishing the design criteria of the present invention, the shear load carrying feature of the design does not alter the V-clamp band tension nor the forces applied to the wedge retainer member. Equally important, the solution offered by the present invention not only does not depend upon friction, but further permits a separation testing of the shear pins as part of the test of the V-clamp release without requiring special testing jigs. As will be appreciated the shear carrying capabilities of the present invention is ensured even when the flanges between the separable component parts of the spacecraft gap.

Referring to FIG. 1, a conceptual schematic view of a spacecraft 2, such as a satellite, is disclosed having at least a first separable component part 4 and a second separable component part 6. For example, the orbiting satellite 4 could be separated from a propulsion motor 6 upon the release of a clamping connection assembly 8.

Figure 5:
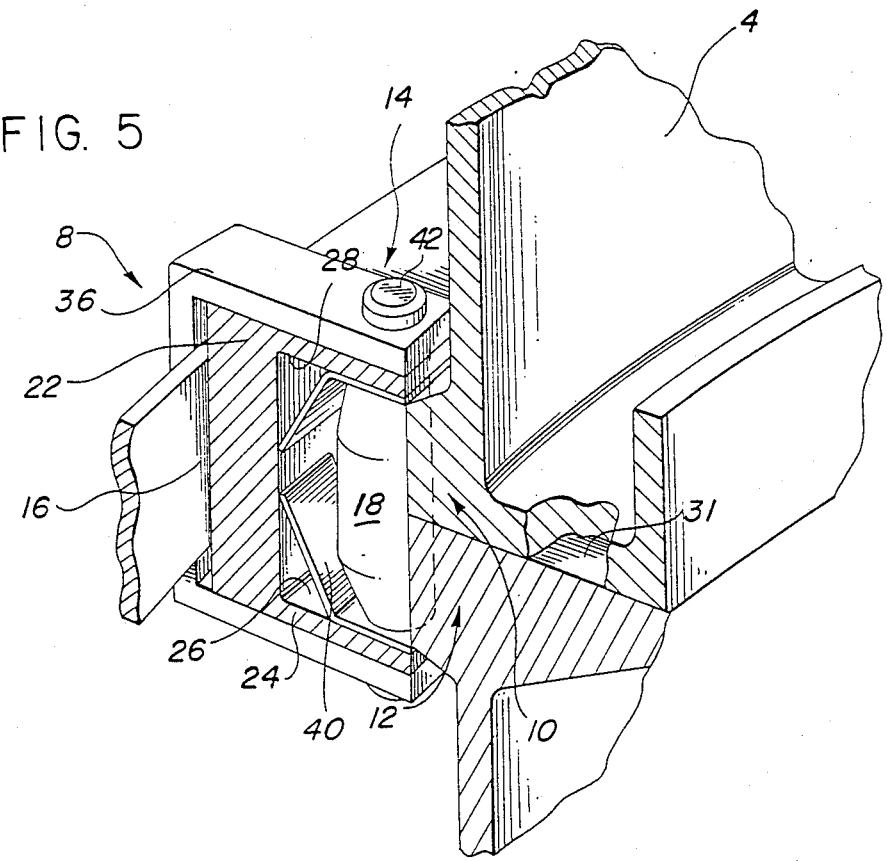
FIG. 5 is a perspective cut away side view of the present invention.

Referring to FIGS. 3 and 5, a first flange 10 is providing on the spacecraft component part 4 and a second flange 12 is provided on the second spacecraft component part 6. The exterior surfaces or the upper and lowermost surfaces in the axial direction (A—A) have camming surfaces 30 and 32, respectively. The intermediate contact surfaces 31 are preferably smooth and planar. The outer periphery of the flanges are cylindrical and are provided with detents 20. A retainer or wedge clamping member 14 has upper and lower retainer flanges 22 and 24 that support internal retainer camming surfaces 26 and 28 of a complimentary design for interfacing with the exterior camming surfaces 30 and 32 of the spacecraft's flange members 10 and 12. A tension strap or belt 16 of, for example, a titanium material as known in the art, is used to produce the axial forces that are applied through the retaining members 14 that are peripherally spaced about the circumference of the flanges 10 and 12. The tension strap 16 creates inward radial forces on the roughly V-shaped retainer member 14 which in turn wedges the flanges 10 and 12 to load the contact surfaces 31 in an axial direction, A—A as shown in FIG. 1. As mentioned earlier, the retainer member 14 is designed basically to transfer axial loads and bending moments across the structural joint between the separable component parts 4 and 6 of the spacecraft.

The two principal types of loading carried across the V-band coupling are axial tension or compression, $P_{ax}$, and bending moment M. Both of these loadings may be combined and expressed as a load intensity N per linear unit of joint circumference $2\pi R$:

Axial load intensity $N_p$:

$$N_p = \frac{P_{ax}}{2\pi R}$$

Bending load intensity $N_M$:

$$N_M = \frac{M \cos \phi}{\pi R^2}$$

where $\phi$ is measured from the line of the applied moment vector.

Maximum total load intensity N:

$$N = \frac{P_{ax}}{2\pi R} + \frac{M}{\pi R^2}$$

Temperature correction factors and design safety factors may be applied to define a maximum design load or load intensity. This maximum design load will then form the basis for sizing the V-coupling retainers and the spacecraft flanges. Typically, all structural elements were required to sustain critical design loading without a permanent material set and in order to preclude vibratory impact and slipping within a V-coupling joint, clamp elastic characteristics and preloading were usually selected such that both flange and flange/retainer separation did not occur.

The wedging force applied by a V-coupling retainer member 14 as a result of strap tension is proportional to the V-angle, that is, the smaller the flange angle the smaller the requirement on the band tension for transferring a specific load across the coupling joint. As may be readily appreciated, smaller tension loads are desirable for achieving a lightweight clamp connection design. Consideration of friction and concern for locking of the retainer member 14 to the respective flanges 10 and 12 that are under axial loads, establish a lower limit for the angle.

The basic V-coupling design is not configured for the transfer of shear and torque forces other than by friction. The prior art has attempted to address these design considerations through the use of splines or retractable shear cones to assist in carrying any large shear and/or torsion loads. This design approach affects the proven performance of the basic V-coupling heretofore relied upon in the prior art and it adds the need for separation testing to ensure release of the coupling. As can be readily appreciated, the present invention is not required to alter these design features of a clamping connector assembly nor does it increase the demands upon the tension strap 16 and retainer member 14.

Figure 6:
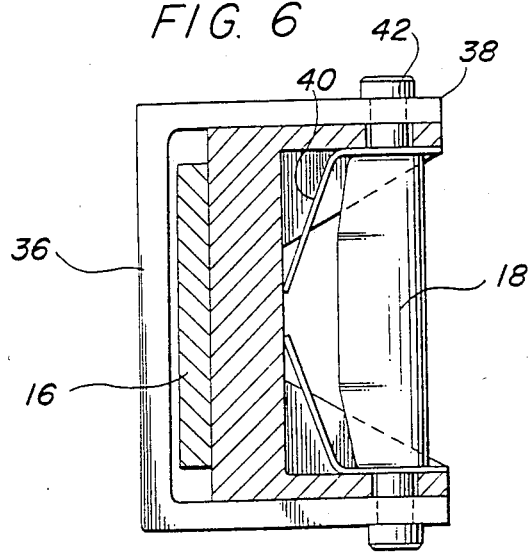
FIG. 6 is a partial cross-sectional side view of a portion of the present invention.

Referring to FIG. 2, a partial plan view of a clamping connector assembly 8 is disclosed and illustrates the plurality of floating retainer members 14 that are spaced about the circumference of the spacecraft. Pyro bolts 44 can adjust the tension through a threaded tightener assembly 46. Usually the tension band 16 is hammered, in an attempt to equalize the forces about the circumference, while the clamping tension is increased through the tightener assembly 46. The shear pins 18, for example, as shown in FIGS. 5 and 6, are mounted in apertures 34 on the respective retainer flanges 22 and 24. These apertures can be of a relatively loose tolerance to permit radial movement of the shear pins 18. Additionally the configuration of the shear pins can be of a cross-sectional circular or oblong configuration, as shown in FIGS. 5 and 6 as long as they don't provide a camming surface relative to the flange detents 20 to increase the radial loading on the tension band 16. Spring members such as leaf springs 40, can be used to bias the shear pins in a radially inward direction while permitting sufficient outer radial movement for any variances in tolerances between the shear pin and its corresponding detent 20 on the outer peripheral edges of the retainer flanges 22 and 24. A mounting bracket 36 can be mounted on retention heads 42 on the shear pins 18 and serve to guide or retain the tension band 16. While not shown, mounting brackets to catch or retain the parts of the clamping connection assembly after release are used.

As an alternative design, not disclosed in the drawings, the retension flanges 22 and 24 of the retainer member 14 can carry appropriate detents to interface with bosses or shear projections mounted on the upper and lower surfaces of the first and second flanges of the spacecraft component parts. Thus, the smooth planar contact surface can be retained between the flanges while the bosses can interface with detents on the flanges of the retainer member 14 for transmitting the shear and torsional forces and preventing relative rotation movement between the flange members. Thus, while the preferred embodiment uses shear pins extending between the retainer flanges 22 and 24, means can be provided on the flange member and the retainer member for cooperatively preventing relative movement between the flange members and thus, transmit the shear and torsional forces. Such a design, however, may require redesign of the retainer member since it would now be subject to bending moments.

While the above embodiments fully disclose the advantages and features of the present invention, it should be readily understood that a person skilled in this field, once provided with these teachings, would be capable of variance therefrom.

Accordingly the scope of the present invention should be determined in accordance with the following claims, wherein I claim:

1. In a spacecraft having first and second separable components joined by a tension strap V-clamp assembly so as to be held together along an axial direction while subject to both axial loads and bending moments, the improvement of a connection assembly comprising:
   a first flange member having a first detent on the first spacecraft component; flange members to hold them together; and
   a second flange member having a second detent on the second spacecraft component;
   a retainer member for transmitting the radial force of the tension strap to the first and second flange members to hold them together; and
   a shear pin mounted on the retainer member for engaging the complimentary first and second detents, the shear pin and detents cooperatively preventing relative rotational movement between flange members, the shear pin being capable of transmitting shear and torsional forces without increasing the axial load created by the tension strap or locking the connection assembly to prohibit a predetermined release.

2. The invention of claim 1 wherein the detent on each flange member extends from a respective contact surface to a camming surface along a peripheral edge of the flange member.

3. The invention of claim 2 wherein the retainer member includes first and second retention flanges each including an aperture, the shear pin being loosely journalled within the respective apertures.

4. The invention of claim 3 further including a spring member to bias the shear pin to one side of the apertures.

5. In a spacecraft having first and second separable components joined by a releasable tension strap so as to be held together along an axial direction, while subject to both axial loads and bending moments, the improvement of a connection assembly comprising:
   a first flange member on the first spacecraft component having a first camming surface and a second contact surface, the first surface being positioned at an acute angle to the second surface;
   a second flange member on the second spacecraft component, having a first camming surface and a second contact surface complimentary to the first flange member contact surface, the first surface being positioned at an acute angle to the second surface, the respective contact surfaces being smooth;
   a retainer member, for transmitting the radial force of the tension strap to the first and second flange members to hold them together, having a pair of complimentary camming surfaces to co-act with the first camming surfaces of the first and second flange members to create an axial force from the radial force of the tension strap, and
   means on the first and second flange members and retainer member for cooperatively preventing relative rotational movement between the smooth contact surfaces of the flange members, including on the retainer member at least a shear pin capable of restraining shear and torsional forces, without increasing the axial load created by the tension strap or locking the connection assembly to prohibit a predetermined release of the smooth contact surfaces and at least a pair of complimentary detents positioned on the peripheral edges of the flange members for receiving the shear pin.

6. The invention of claim 5 wherein the retainer member includes a first and second retention flange having apertures, the shear pin being loosely journalled within the respective apertures.

7. The invention of claim 6 further including a spring member to bias the shear pin to one side of the aperture.

8. In a spacecraft having first and second separable components joined by a releasable tension strap so as to be held together along an axial direction, while subject to both axial loads and bending moments, the improvement of a connection assemblies positioned about the spacecraft, each of them comprising:
   a first flange member on the first spacecraft component having a first camming surface and a second contact surface, the first surface being positioned at an acute angle to the second surface;
   a second flange member on the second spacecraft component, having a first camming surface and a second contact surface complimentary to the first flange member contact surface, the first surface being positioned at an acute angle to the second surface, the respective contact surfaces being planar and smooth;
   a plurality of retainer members, for transmitting the radial force of the tension strap to the first and second flange members to hold them together, each having a pair of retention flanges with complimentary camming surfaces to co-act with the first camming surfaces of the first and second flange members to create an axial force from the radial force of the tension strap, and
   means on the first and second flange members and each retainer member for cooperatively preventing relative rotational movement between the smooth contact surfaces of the flange members, including on the retainer member at least a shear pin extending between the retainer member camming surfaces capable of restraining shear and torsional forces, without increasing the axial load created by the tension strap nor locking the connection assembly to prohibit a predetermined release of the smooth contact surfaces and at least and no more than a pair of complimentary detents, one on each of the outer peripheral edges of the first and second flange members for receiving the shear pin.

9. The invention of claim 8 wherein each retainer member includes a first and second retention flange having apertures, the shear pin being loosely journalled within the respective apertures.

10. The invention of claim 9 further including a spring member to bias the shear pin to one side of the aperture.

* * * * *

UNITED STATES PATENT AND TRADEMARK OFFICE
CERTIFICATE OF CORRECTION

PATENT NO. : 4,715,565
DATED : December 29, 1987
INVENTOR(S) : Alois Wittmann

It is certified that error appears in the above—identified patent and that said Letters Patent is hereby corrected as shown below:

Column 7, lines 20-21, delete "flange members to hold them together; and"

Signed and Sealed this

Ninth Day of January, 1990

Attest:

JEFFREY M. SAMUELS

Attesting Officer     Acting Commissioner of Patents and Trademarks